(12) United States Patent
Dai et al.

(10) Patent No.: US 10,539,771 B2
(45) Date of Patent: Jan. 21, 2020

(54) RAPID THREE-DIMENSIONAL MULTISPECTRAL MICROSCOPIC IMAGING SYSTEM

(71) Applicant: TSINGHUA UNIVERSITY, Beijing (CN)

(72) Inventors: Qionghai Dai, Beijing (CN); Jiamin Wu, Beijing (CN); Jijun He, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 104 days.

(21) Appl. No.: 15/629,220

(22) Filed: Jun. 21, 2017

(65) Prior Publication Data
US 2018/0203218 A1 Jul. 19, 2018

(30) Foreign Application Priority Data
Jan. 13, 2017 (CN) .......................... 2017 1 0024268

(51) Int. Cl.
*G02B 21/00* (2006.01)
*G02B 21/06* (2006.01)

(52) U.S. Cl.
CPC ..... *G02B 21/0024* (2013.01); *G02B 21/0032* (2013.01); *G02B 21/0064* (2013.01)

(58) Field of Classification Search
CPC .............. G02B 21/00; G02B 21/0016; G02B 21/0028; G02B 21/0032; G02B 21/0052; G02B 21/0056; G02B 21/0064; G02B 21/008; G02B 21/36; G02B 21/361; G02B 21/0024
See application file for complete search history.

(56) References Cited

U.S. PATENT DOCUMENTS

| 6,838,650 | B1* | 1/2005 | Toh ..................... | G02B 21/0024 250/201.3 |
| 8,184,298 | B2* | 5/2012 | Popescu ............. | G01N 15/1434 356/450 |
| 10,356,390 | B2* | 7/2019 | Dai | |
| 2008/0252977 | A1* | 10/2008 | Iwamoto ................ | G02B 27/22 359/559 |
| 2012/0026311 | A1* | 2/2012 | Ouchi ..................... | G02B 21/06 348/79 |

(Continued)

*Primary Examiner* — Thong Q Nguyen
(74) *Attorney, Agent, or Firm* — David D. Brush; Westman, Champlin & Koehler, P.A.

(57) ABSTRACT

An imaging system is provided, which includes: a microscope; a field diaphragm; a one-dimensional beam-splitting grating, configured to duplicate a beam after passing through the first 4f system into beams with different angles; a phase modulation component, configured to perform different phase modulations to the beams with different angles respectively; a blazed grating, configured to perform dispersion to the beams with different angles passing through the phase modulation component at a dimension orthogonal to the beam-splitting grating; a micro lens array, configured to make the beams with different angles passing through the blazed grating to map to different locations on a back focal plane of the micro lens array; an image sensor, configured to image the back focal plane of the micro lens array. The system may recover three-dimensional information and multispectral information of the sample simultaneously from a single image.

11 Claims, 4 Drawing Sheets

(56) References Cited

U.S. PATENT DOCUMENTS

| | | | |
|---|---|---|---|
| 2013/0100525 A1* | 4/2013 | Chiang | G02B 21/082 359/385 |
| 2016/0278637 A1* | 9/2016 | Gao | A61B 3/14 |
| 2018/0210187 A1* | 7/2018 | Dai | G02B 27/106 |

\* cited by examiner

RAPID THREE-DIMENSIONAL MULTISPECTRAL MICROSCOPIC IMAGING SYSTEM

CROSS-REFERENCE TO RELATED APPLICATIONS

This application is based on and claims a priority to Chinese Patent Application Serial No. 201710024268.2, filed on Jan. 13, 2017, the entire content of which is incorporated herein by reference.

FIELD

The present disclosure generally relates to a technical field of optics and informatics, and more particularly, to a rapid three-dimensional multispectral microscopic imaging system.

BACKGROUND

With the booming development of biology and material science, multi-dimensional visual information is required in more and more applications, which includes information in a space dimension, a spectrum dimension, and a time dimension, but not only a traditional two-dimensional imaging. The rapid three-dimensional multispectral microscopic imaging technology is used in fields such as multi-fluorescence-marked dynamic process observation, high-throughput chromatography, medicine science, material analysis in changing environment, etc.

SUMMARY

A rapid three-dimensional multispectral microscopic imaging system is provided in embodiments of the present disclosure, which includes: a microscope, configured to magnify a sample, to image the sample onto an image plane of the microscope and to output the image plane of the microscope through an output port of the image plane; a field diaphragm, disposed at the image plane output by the microscope and configured to restrict a field range of imaging; a one-dimensional beam-splitting grating, coupled to the field diaphragm through a first 4f system, and disposed at a back focal plane of the first 4f system and configured to duplicate a beam after passing through the first 4f system into beams with different angles; a phase modulation component, configured to perform different phase modulations to the beams with different angles respectively; a blazed grating, coupled to the one-dimensional beam-splitting grating through a second 4f system, disposed at a back focal plane of the second 4f system, and configured to perform dispersion to the beams with different angles passing through the phase modulation component at a dimension orthogonal to the beam-splitting grating so as to map spectral information of the sample to one-dimensional vision; a micro lens array, coupled to the blazed grating through a third 4f system, disposed at a back focal plane of the third 4f system, and configured to make the beams with different angles passing through the blazed grating to map to different locations on a back focal plane of the micro lens array; an image sensor, configured to image the back focal plane of the micro lens array to acquire a three-dimensional multispectral image.

In some embodiments, the number of the beams duplicated by the one-dimensional beam-splitting grating is adjustable.

In some embodiments, the number of beams duplicated by the one-dimensional beam-splitting grating is determined according to the required number of axial layers in space.

In some embodiments, the beams modulated by the phase modulation component have different point spread functions respectively.

In some embodiments, the phase modulation component is disposed at a Fourier plane of the second 4f system behind the beam-splitting grating.

In some embodiments, the phase modulation component includes a lens array with different focal lengths, and the lens array with different focal lengths is configured to perform the different phase modulations to the beams with different angles to obtain different focal positions corresponding respectively the beams with different angles, so as to make the beams duplicated by the one-dimensional beam-splitting grating to correspond to image planes in different depths.

In some embodiments, the image sensor is coupled to the micro lens array through a fourth 4f system or a preset lens.

In some embodiments, the system further includes: a processing component, configured to reconstruct and restore the three-dimensional multispectral image to acquire three-dimensional hyperspectral information of the sample.

In some embodiments, the blazed grating comprises an Amici prism or a triangular prism.

In some embodiments, the image sensor comprises a monochromatic image sensor.

In some embodiments, the number of acquired spectral bands of the sample is in accordance with the number of the beams duplicated by the one-dimensional beam-splitting grating.

In some embodiments, a numerical aperture extended via the one-dimensional beam-splitting grating is in accordance with and a numerical aperture extended via the blazed grating.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Figure 1:
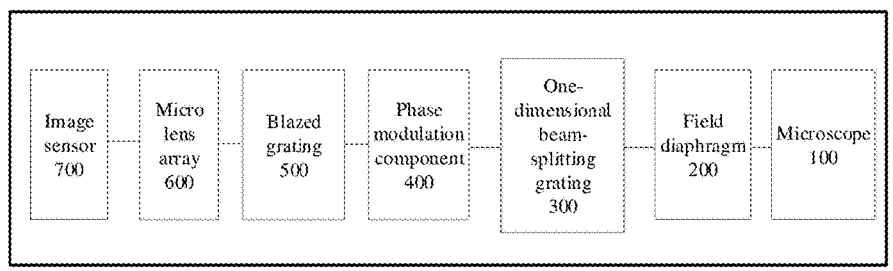
FIG. 1 is a block diagram illustrating a rapid three-dimensional multispectral microscopic imaging system according to embodiments of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

In the specification, it is to be understood that terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation, thus cannot be seen as restrictions to the present disclosure. In addition, terms such as "first" and "second" are used herein only for purposes of description and are not intended to indicate or imply relative importance or significance or to imply the number of indicated technical features.

It should be noted that in the description of the present invention, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements. The particular meanings of above terms can be understood by those skilled in the art according to specific situations.

A rapid three-dimensional multispectral microscopic imaging system according to embodiments of the present disclosure will be illustrated with reference to drawings as follows.

FIG. 1 is a block diagram illustrating a rapid three-dimensional multispectral microscopic imaging system according to an embodiment of the present disclosure. As shown in FIG. 1, the rapid three-dimensional multispectral microscopic imaging system includes a microscope 100, a field diaphragm 200, a one-dimensional beam-splitting grating 300, a phase modulation component 400, a blazed grating 500, a micro lens array 600, and an image sensor 700.

In detail, the microscope 100 is configured to magnify a sample, to image the sample onto an image plane of the microscope 100 and to output the image plane of the microscope 100 through an output port of the image plane. That is, the microscope 100 is configured to perform a primary-stage magnification to the sample (such as a microscopic sample), and to export an image plane thereof through an output port of the image plane for further beam-spitting encoding, i.e. the beam duplicating at a posterior stage.

The field diaphragm 200 is disposed at the image plane output by the microscope 100 and is configured to restrict a field range of imaging at the posterior stages so as to make an optical path of the system easy to be adjusted.

The one-dimensional beam-splitting grating 300 is coupled to the field diaphragm 200 through a first 4f system and disposed at a back focal plane of the first 4f system. The one-dimensional beam-splitting grating 300 is configured to duplicate a beam after passing through the first 4f system into beams with different angles.

In an embodiment, the number of the beams duplicated by the one-dimensional beam-splitting grating 300 is adjustable. For example, the number of the beams can vary with patterns photoetched to the one-dimensional beam-splitting grating 300.

In an embodiment, the number of the beams duplicated by the one-dimensional beam-splitting grating 300 is determined according to the required number of axial layers in space for the acquisition. What we captured is 3D information of the sample. For example, if there is a sampling rate in axial dimension, e.g. 3D information of 512*512*30 pixels for the 3D volume has 30 axial layers. For example, when an 11-layer axial acquisition is needed, a 1*11 beam-splitting grating may be chosen.

In detail, the 4f system (such as the first 4f system, and a second, third and fourth 4f systems described below) includes two lenses with focal length F, in which, the distance between the two lenses is 2F, the object distance is F, and the image distance is F, too.

The phase modulation component 400 is configured to perform different phase modulations to beams having different angles, so as to obtain different point spread functions for the final acquisition.

In an embodiment of the present disclosure, the phase modulation component 400 is disposed at, for example, a Fourier plane in the middle of the second 4f system behind the one-dimensional beam-splitting grating 300.

In an embodiment of the present disclosure, the phase modulation component 400 includes a lens array with different focal lengths, and the lens array with different focal lengths is configured to perform the different phase modulations to the beams with different angles to obtain different focal positions corresponding respectively the beams with different angles, so as to make the beams duplicated by the one-dimensional beam-splitting grating to correspond to image planes in different depths. Focused to different axial position has different point spread function. With different point spread function, 3D information may be reconstructed. Different focal position is a particular case for the different point spread function, which is easiest for reconstruction.

The blazed grating 500 is coupled to the one-dimensional beam-splitting grating 300 through a second 4f system, disposed at a back focal plane of the second 4f system, and configured to perform dispersion to the beams with different angles passing through the phase modulation component 400 at a dimension orthogonal to the beam-splitting grating so as to map spectral information of the sample to one-dimensional vision.

Figure 4:
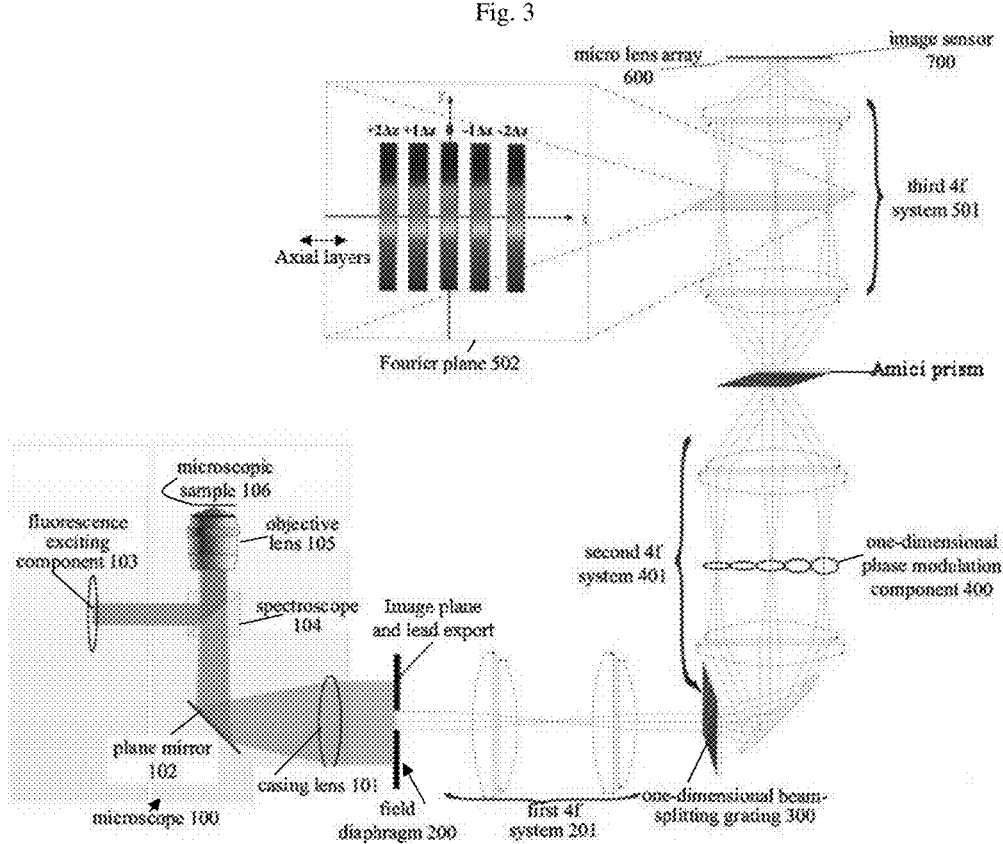
FIG. 4 is a schematic diagram illustrating an optical path in a rapid three-dimensional multispectral microscopic imaging system according to an embodiment of the present disclosure.
Figure 5:
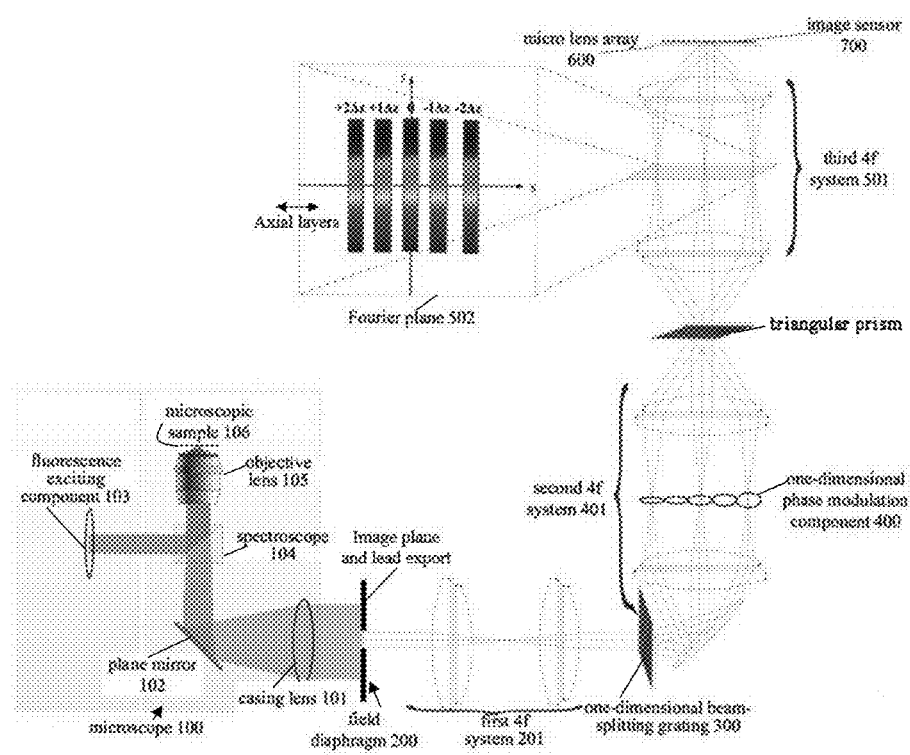
FIG. 5 is a schematic diagram illustrating an optical path in a rapid three-dimensional multispectral microscopic imaging system according to an embodiment of the present disclosure.

In an embodiment of the present disclosure, the blazed grating 500 may use other kinds of dispersion mode to obtain the same effect. In detail, the blazed grating 500 may be an Amici prism, as shown in FIG. 4, or a triangular prism, as shown in FIG. 5, for example.

The micro lens array 600 is coupled to the blazed grating 500 through a third 4f system, disposed at a back focal plane of the third 4f system, and configured to make the beams with different angles passing through the blazed grating 500 to map to different locations on a back focal plane of the micro lens array.

The image sensor 700 is configured to image the back focal plane of the micro lens array 600 to acquire a three-dimensional multispectral image. In detail, for example, the image sensor 700 is coupled to the micro lens array 600 through a fourth 4f system or a preset lens. In detail, the preset lens is a normal coupling lens in the art.

It should be noted that, when choosing 11 layers of different depths to acquire simultaneously, corresponding spectral paths should also be 11, furthermore, each lens in the micro lens array 600 should correspond to 11*11 pixels in posterior stages, moreover, numerical apertures (including numerical apertures of the micro lens array 600 and numerical apertures of the microscope 100) in the whole system must be matched thereof. It should be especially noted that the numerical aperture extended via the one-dimensional beam-splitting grating 300 and the numerical aperture extended via the blazed grating in the blazed grating 500 must keep accordance.

In an embodiment of the present disclosure, the image sensor 700 is a monochrome image sensor, for example.

Figure 3:
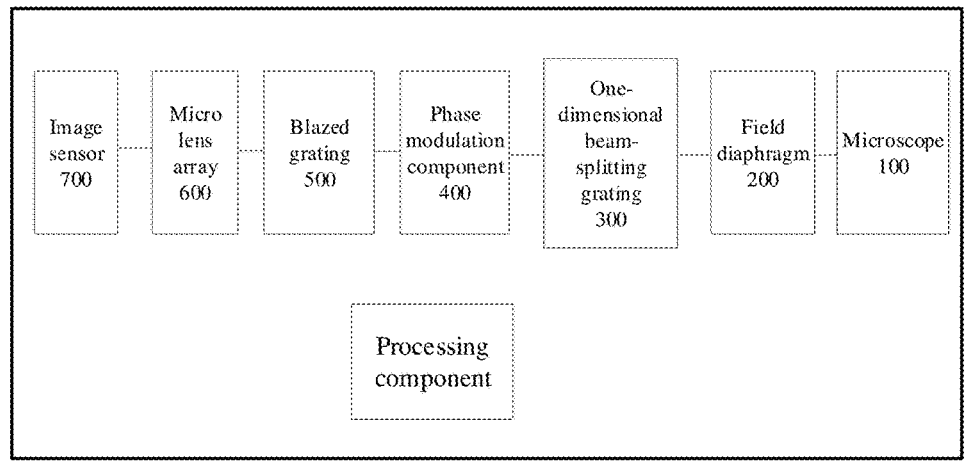
FIG. 3 is a block diagram illustrating a rapid three-dimensional multispectral microscopic imaging system according to embodiments of the present disclosure.

In an embodiment of the present disclosure, the system may further include a processing component (as shown in FIG. 3). The processing component is configured to reconstruct and restore coupled data acquired by the rapid three-dimensional multispectral microscopic imaging system, so as to obtain three-dimensional hyperspectral information of the microscopic sample. The coupled data is captured by the sensor, which is modulated by the whole system and has the 4D information coupled in 2D sampling. In detail, multiple pictures with different phase modulations in different spectral bands of the sample are obtained by extracting corresponding points from an image formed on the image sensor 700 behind the micro lens array 600, i.e. the sample is sampled in two dimensions in space by the micro lens array 600 with lenses of periodic distribution, and each pixel behind the micro lens array 600 corresponds to a light intensity in a certain depth within a certain band at a certain transverse position. Via extractions and reconstructions of the pixels, four-dimensional information in different depths within different spectral bands, i.e. three-dimensional multispectral data of the microscopic sample, may be obtained at a fast speed.

In an embodiment of the present disclosure, the number of beams duplicated by the one-dimensional beam-splitting grating 300 is adjustable. Based on this, the number of acquired spectral bands keeps accordance with the number of beams duplicated by the one-dimensional beam-splitting grating 300. For example, a duplicating dimension of the one-dimensional beam-splitting grating 300 is 1*5, in practice, the duplicating dimension may be adjusted according to requirements as long as it keeps in one-dimension. Accordingly, the number of acquired spectral bands is 5, in practice, the acquired spectral bands only need to keep accordance with the number of the duplicated beams.

In specific embodiments, the rapid three-dimensional multispectral microscopic imaging system according to embodiments of the present disclosure may be suitable for both a fluorescence imaging and a bright field imaging.

In other words, the main constitute and principle of the rapid three-dimensional multispectral microscopic imaging system according to the above embodiments of the present disclosure can be summarized as follows. The system can realize a rapid three-dimensional multispectral microscopic imaging, and can acquire three-dimensional information and multispectral information of the microscopic sample simultaneously at a camera frame rate (i.e. within a snapshot) via a not quite complicated modification to a conventional microscope, and is a technology of imaging under five-dimensional signals (three dimensions of spatial information, one dimension of spectral information and one dimension of time information). The system includes the following elements. The microscope is configured to perform a primary-stage magnification to the microscopic sample and to export an image plane through an output port. The field diaphragm is configured to restrict the range of visual field. The one-dimensional beam-splitting grating is disposed at an image plane of the second stage after the primary-stage. The phase modulation component is disposed at a Fourier plane after the one-dimensional beam-splitting grating and configured to perform different phase modulations on different beams so as to obtain different point spread functions. A diffraction grating (for example, a blazed grating) is disposed at an image plane of the third stage after the second stage and configured to map different spectral information to different angles in a dimension that is different from the dimension that the beams duplicated by the beam-splitting grating. Diffraction will introduce the dispersion and spread the spectral information into different angles. Afterwards, the image plane is further amplified by the diffraction grating to the micro lens array at the fourth stage after the third stage with the numerical aperture extended by the diffraction grating matching to the numerical aperture of the micro lens. At last the back focal plane of the micro lens array is imaged on the image sensor. Furthermore, via performing a three-dimensional deconvolution algorithm using the different point spread functions in each spectral band, multispectral information of each voxel of the sample may be computationally reconstructed with high resolution in three-dimensional level. Voxel means the minimum sampling point of the sample in 3D after discretization. Like 512*512*30 pixels can also be represented as 512*512*30 voxels. Each voxel represents the smallest cube of the discretized sample. The system realizes a three-dimensional multispectral video acquisition in 30 Hz with one camera via simple system modification, and therefore rapid three-dimensional imaging with multiple fluorescence marks may be achieved, fluorescence aliasing and spontaneous fluorescence may be reduced, three-dimensional spectral constituent analyzing of various biological samples and materials may be realized in bright field.

With the rapid three-dimensional multispectral microscopic imaging system according to embodiments of the present disclosure, information of the sample is acquired in different depths (i.e. in three-dimension) within different spectral bands simultaneously, thus a four-dimensional (including three dimensions of spatial information and one dimension of spectral information) coupled sampling of the sample may be achieved via one camera through one time exposure, the light efficiency is increased.

Figure 2:
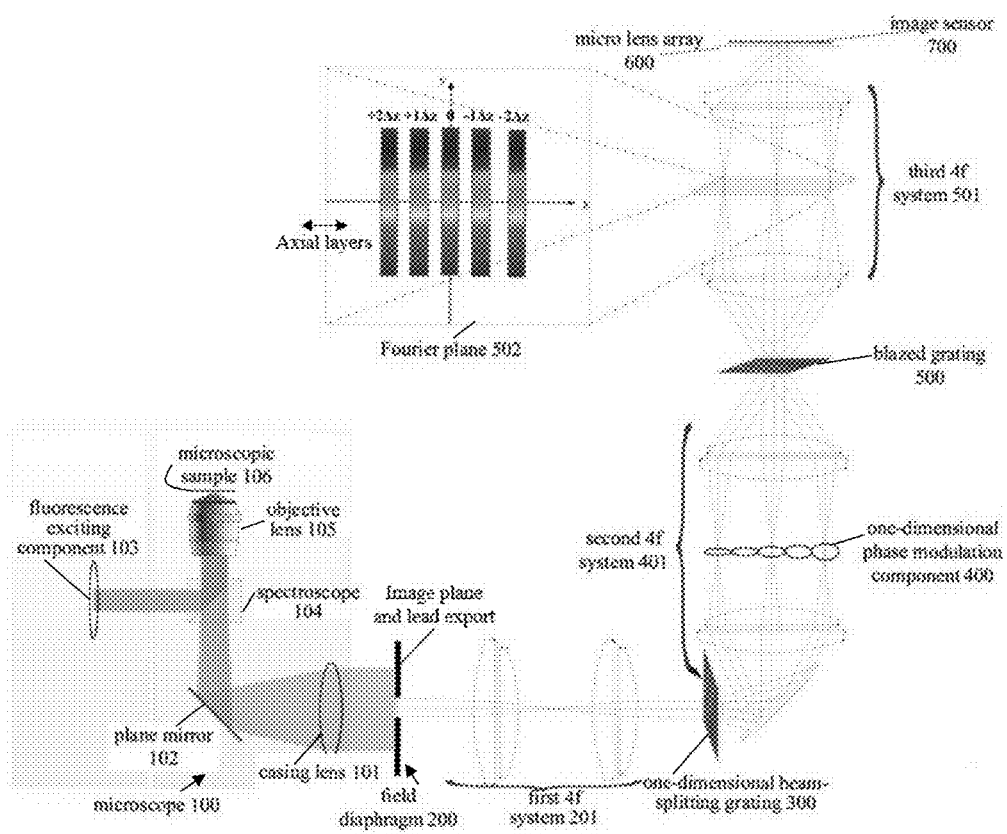
FIG. 2 is a schematic diagram illustrating an optical path in a rapid three-dimensional multispectral microscopic imaging system according to an embodiment of the present disclosure.

In order to make the present disclosure more easily to appreciate, further detail descriptions of the rapid three-dimensional multispectral microscopic imaging system according to embodiments of the present closure will be illustrated by a particular embodiment with reference to FIG. 2.

In this embodiment, with reference to FIG. 2, the system includes a microscope 100, a field diaphragm 200, a one-dimensional beam-splitting grating 300, a one-dimensional phase modulation component 400, a one-dimensional blazed grating 500, a micro lens array 600, and an image sensor 700.

In detail, with reference to FIG. 2, the microscope 100 outputs an amplified image plane of the microscopic sample 106 through an image output port of the microscope 100 and the amplified image plane is formed through an objective lens 105, a plane mirror 102 and a casing lens 101, in which the sample is excited via a conventional fluorescence exciting component 103 and a spectroscope 104. The field diaphragm 200 is provided on the image plane outputted by the microscope 100 to restrict a total visual field so as to make the system easy to be adjusted. The above elements are further followed by and connected to the one-dimensional beam-splitting grating 300 via a first 4f system 201. The beam in the original image plane passing through the field diaphragm 200 is duplicated by the beam-splitting grating to multiple beams at different angles in one dimension, for example, three duplicated beams are shown in this figure. The optical path may further pass through a second 4f system 401. The one-dimensional phase modulation component is disposed at a Fourier plane of the second 4f system 401 and configured to perform different phase modulations to the duplicated beams to make them possessing different point spread functions on an image plane, in which as shown in FIG. 2, the phase modulation component may be a 1*5 lens array with different focal lengths. The blazed grating is disposed at an image plane of the second 4f system 401 and configured to make the image plane to be dispersed in large-angle in another dimension, so as to obtain spectral information in another dimension of an angle field. The image plane where the blazed grating disposed at is further followed by and connected to the micro lens array 600 through a third 4f system 501. In detail, a magnified schematic diagram on the Fourier plane of the third 4f system 501 is shown in FIG. 2 with a reference number 502, the original Fourier plane is extended to two dimensions, of which, one dimension corresponds to different spectral information, the other dimension corresponds to different depth information, thus a four-dimensional information encoding is achieved. Furthermore, the micro lens array 600 is used to sample information in two spatial dimensions and in two angle dimensions, i.e. the four-dimensional information, so as to achieve simultaneously sampling of the three-dimensional spatial and one-dimensional spectral information. Acquisition of the final image is accomplished by the image sensor 700 disposed on a back focal plane of the micro lens array 600, and thus an acquisition of the three-dimensional multispectral information is achieved. For example, the first 4f system 201, the second 4f system 401, and the third 4f system 501 are the same.

In this embodiment, the above microscope 100 may be a traditional commercial microscope, or may be a positive position microscope or an inverted microscope according to different applications. Embodiments of the present disclosure do not limit to the positive position microscope shown in FIG. 2, and structures and functions of the microscopes are already known by those skilled in the art, thus will not be elaborated here.

Furthermore, in the present embodiment, the computational process for recovering three-dimensional hyperspectral information (four-dimensional information) of the microscopic sample is achieved through processing an image acquired by the above system via coupled spatial and spectral sampling. The acquired image is calibrated first, for example, when 5 different depths and 5 different spectral bands need to be sampled simultaneously, each lens in the micro lens array corresponds to 5*5 pixels in the image sensor. A primary adjustment may be accomplished by slight translation of the image sensor and a further calibration may finish the correspondence. Each pixel on the image sensor may correspond to an acquisition of a certain spatial position in a certain depth within a certain spectral band. Two-dimensional images corresponding to different depths within different spectral bands may be obtained rapidly by a way of time difference extraction. Further, based on three-dimensional information within different spectral bands, a high-resolution three-dimensional image may be achieved via a conventional three-dimensional deconvolution algorithm using focal stack images.

In the systems according to embodiments of the present disclosure, special attentions should be paid on matches of numerical apertures of the whole system. When passing through the one-dimensional beam-splitting grating and the blazed grating, a numerical aperture provided by the objective lens itself may experience an expanding of the numerical aperture on each of their respective dimensions, expanding degrees of both of them need to be kept correspondence with each other and match to the numerical aperture of the micro lens array, so as to avoid aliasing and under-sampling on the final image plane.

In summary, the rapid three-dimensional multispectral microscope imaging system according to embodiments of the present disclosure may acquire high resolution, high accuracy multispectral three-dimensional data by one camera via one time of exposure, and a five-dimensional imaging technology of optical microscope is achieved. The system achieves a multispectral stereoscopic video acquiring system based on one camera for the first time and has a wide application prospect. Compared with traditional time-domain scanning method, optical design and computational reconstruction are combined in the system, via taking full advantages of the sparsity of visual information, the acquisition time is reduced and therefore bleaching of fluorescence samples is avoided.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of the present disclosure have been shown and described above, it should be understood by those skilled in the art, changes, alternatives, and modifications can be made to the embodiments without departing from spirit, principles, and scope of the present disclosure. The scope of the present disclosure is limited by the attached claims and its equivalents.

What is claimed is:

1. A rapid three-dimensional multispectral microscopic imaging system, comprising:
   a microscope, configured to magnify a sample, to image the sample onto an image plane of the microscope and to output the image plane of the microscope through an output port of the image plane;
   a field diaphragm, disposed at the image plane output by the microscope and configured to restrict a field range of imaging;
   a one-dimensional beam-splitting grating, coupled to the field diaphragm through a first 4f system, and disposed at a back focal plane of the first 4f system and configured to duplicate a beam after passing through the first 4f system into beams with different angles;
   a phase modulation component, disposed in a middle of a second 4f system configured to perform different phase modulations to the beams with different angles respectively;

a blazed grating, coupled to the one-dimensional beam-splitting grating through the second 4f system, disposed at a back focal plane of the second 4f system, and configured to perform dispersion to the beams with different angles passing through the phase modulation component at a dimension orthogonal to the beam-splitting grating so as to map spectral information of the sample to one-dimensional vision;

a micro lens array, coupled to the blazed grating through a third 4f system, disposed at a back focal plane of the third 4f system, and configured to make the beams with different angles passing through the blazed grating map to different locations on a back focal plane of the micro lens array;

an image sensor, configured to image the back focal plane of the micro lens array to acquire a three-dimensional multispectral image.

2. The rapid three-dimensional multispectral microscopic imaging system according to claim 1, wherein the number of the beams duplicated by the one-dimensional beam-splitting grating is adjustable.

3. The rapid three-dimensional multispectral microscopic imaging system according to claim 2, wherein, a number of acquired spectral bands of the sample is in accordance with the number of the beams duplicated by the one-dimensional beam-splitting grating.

4. The rapid three-dimensional multispectral microscopic imaging system according to claim 1, wherein the number of beams duplicated by the one-dimensional beam-splitting grating is determined according to a required number of axial layers in space.

5. The rapid three-dimensional multispectral microscopic imaging system according to claim 1, wherein the beams modulated by the phase modulation component have different point spread functions respectively.

6. The rapid three-dimensional multispectral microscopic imaging system according to claim 1, wherein, the phase modulation component is disposed at a Fourier plane of the second 4f system behind the beam-splitting grating.

7. The rapid three-dimensional multispectral microscopic imaging system according to claim 1, wherein, the phase modulation component comprises a lens array with different focal lengths, and the lens array with different focal lengths is configured to perform the different phase modulations to the beams with different angles to obtain different focal positions corresponding respectively the beams with different angles, so as to make the beams duplicated by the one-dimensional beam-splitting grating to correspond to image planes in different depths.

8. The rapid three-dimensional multispectral microscopic imaging system according to claim 1, further comprising:
    a processing component, configured to reconstruct and restore the three-dimensional multispectral image to acquire three-dimensional hyperspectral information of the sample.

9. The rapid three-dimensional multispectral microscopic imaging system according to claim 1, wherein, the blazed grating comprises an Amici prism or a triangular prism.

10. The rapid three-dimensional multispectral microscopic imaging system according to claim 1, wherein, the image sensor comprises a monochromatic image sensor.

11. The rapid three-dimensional multispectral microscopic imaging system according to claim 1, wherein, a numerical aperture extended via the one-dimensional beam-splitting grating is in accordance with a numerical aperture extended via the blazed grating.

* * * * *